United States Patent
Umeda et al.

(10) Patent No.: US 12,272,539 B2
(45) Date of Patent: Apr. 8, 2025

(54) AUXILIARY POWER SUPPLY SYSTEM, MODULE, AUXILIARY POWER SUPPLY CONTROL METHOD, AND PROGRAM

(71) Applicant: Panasonic Intellectual Property Management Co., Ltd., Osaka (JP)

(72) Inventors: Takeshi Umeda, Osaka (JP); Yohsuke Mitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 111 days.

(21) Appl. No.: 18/272,492

(22) PCT Filed: Dec. 27, 2021

(86) PCT No.: PCT/JP2021/048519
§ 371 (c)(1),
(2) Date: Jul. 14, 2023

(87) PCT Pub. No.: WO2022/163279
PCT Pub. Date: Aug. 4, 2022

(65) Prior Publication Data
US 2024/0071706 A1    Feb. 29, 2024

(30) Foreign Application Priority Data
Jan. 26, 2021    (JP) .................. 2021-010516

(51) Int. Cl.
*H01J 7/34*     (2006.01)
*H02J 7/00*     (2006.01)
*H02J 13/00*    (2006.01)

(52) U.S. Cl.
CPC ............ *H01J 7/34* (2013.01); *H02J 7/00045* (2020.01); *H02J 13/00007* (2020.01)

(58) Field of Classification Search
CPC ...... H01J 7/34; H02J 7/00045; H02J 13/00007
See application file for complete search history.

(56) References Cited

U.S. PATENT DOCUMENTS

2005/0269170 A1    12/2005    Mitani et al.
2007/0210650 A1*   9/2007     Togashi ............ G06F 11/1441
                                                    307/43

(Continued)

FOREIGN PATENT DOCUMENTS

| JP | 2005-014754 A | 1/2005 |
| JP | 2007-241827 A | 9/2007 |
| JP | 2018-164320 A | 10/2018 |

OTHER PUBLICATIONS

International Search Report dated Feb. 15, 2022 issued in International Patent Application No. PCT/JP2021/048519 with English translation.

*Primary Examiner* — Jared Fureman
*Assistant Examiner* — Duc M Pham
(74) *Attorney, Agent, or Firm* — Rimon P.C.

(57) ABSTRACT

An auxiliary power supply system includes a plurality of electrical storage devices that supply power to an electrical device. Each of the storage devices has the communication capability with the electrical device. Each of the storage devices provisionally selects one of a plurality of first communication addresses as a provisional communication address of its own. The plurality of first communication addresses have been set for the plurality of electrical storage devices by the electrical device. Each of the storage devices returns a response signal in reply to a transmission signal, to which the provisional communication address of its own is added. Each of the storage devices changes, when finding that any communication error has occurred while returning the response signal, the provisional communication address of its own into one of one or more unused communication (Continued)

addresses belonging to the plurality of first communication addresses that have been set.

20 Claims, 7 Drawing Sheets

(56) References Cited

U.S. PATENT DOCUMENTS

2017/0052917 A1\* 2/2017 Sasagawa ........... G06F 13/4027
2020/0014221 A1 1/2020 Shiiyama et al.

\* cited by examiner

AUXILIARY POWER SUPPLY SYSTEM, MODULE, AUXILIARY POWER SUPPLY CONTROL METHOD, AND PROGRAM

CROSS-REFERENCE OF RELATED APPLICATIONS

This application is the U.S. National Phase under 35 U.S.C. § 371 of International Patent Application No. PCT/JP2021/048519, filed on Dec. 27, 2021, which in turn claims the benefit of Japanese Patent Application No. 2021-010516, filed on Jan. 26, 2021, the entire disclosures of which Applications are incorporated by reference herein.

TECHNICAL FIELD

The present disclosure generally relates to an auxiliary power supply system, a module, an auxiliary power supply control method, and a program. More particularly, the present disclosure relates to an auxiliary power supply system, a module, an auxiliary power supply control method, and a program, all of which are configured or designed to supply power to a backup target.

BACKGROUND ART

Patent Literature 1 discloses an in-vehicle power supply device (auxiliary power supply system) including an electronic controller, a battery (electrical storage device), and a capacitor. The battery supplies power to the electronic controller. The capacitor serves as an auxiliary power supply, is connected between the battery and the electronic controller, and supplies power to the electronic controller when the battery causes a failure.

CITATION LIST

Patent Literature

Patent Literature 1: JP 2005-14754 A

SUMMARY OF INVENTION

If the in-vehicle power supply device of Patent Literature 1 includes a plurality of electrical storage devices, the in-vehicle power supply device needs to assign communication addresses to the plurality of electrical storage devices to control the electrical storage devices on an individual basis. Therefore, in as early as the manufacturing process of the electrical storage devices, the plurality of electrical storage devices needs to be manufactured and managed by identifying the plurality of electrical storage devices from each other by their communication addresses. This makes it difficult to manage the inventory of the respective electrical storage devices, because the inventory of electrical storage devices may become redundant or limited depending on the communication addresses.

In view of the foregoing background, it is therefore an object of the present disclosure to provide an auxiliary power supply system, a module, an auxiliary power supply control method, and a program, all of which are configured or designed to manufacture and manage a plurality of electrical storage devices without identifying the plurality of electrical storage devices by their communication addresses.

An auxiliary power supply system according to an aspect of the present disclosure includes a plurality of electrical storage devices that supply power to a backup target. Each of the plurality of electrical storage devices has a communication capability of communicating with an identical communications partner. Each of the plurality of electrical storage devices provisionally selects one of a plurality of first communication addresses as a provisional communication address of its own. The plurality of first communication addresses have been set for the plurality of electrical storage devices by the communications partner and are as many as the plurality of electrical storage devices. Each of the plurality of electrical storage devices returns a response signal in reply to a transmission signal, to which the provisional communication address of its own is added. Each of the plurality of electrical storage devices changes, when finding that any communication error has occurred while returning the response signal, the provisional communication address of its own into one of one or more unused communication addresses belonging to the plurality of first communication addresses that have been set.

A module according to another aspect of the present disclosure is designed to be used as the electrical storage device in the auxiliary power supply system described above.

An auxiliary power supply control method according to still another aspect of the present disclosure is a method for controlling an auxiliary power supply system including a plurality of electrical storage devices that supply power to a backup target. Each of the plurality of electrical storage devices has a communication capability of communicating with an identical communications partner. The auxiliary power supply control method includes a provisionally selecting step, a returning step, and a changing step.

The provisionally selecting step includes having each of the plurality of electrical storage devices provisionally select one of a plurality of first communication addresses as a provisional communication address of its own. The plurality of first communication addresses have been set for the plurality of electrical storage devices by the communications partner and are as many as the plurality of electrical storage devices. The returning step includes having each of the plurality of electrical storage devices return a response signal in reply to a transmission signal, to which the provisional communication address of its own is added. The changing step includes making each of the plurality of electrical storage devices change, when finding that any communication error has occurred while returning the response signal, the provisional communication address of its own into one of one or more unused communication addresses belonging to the plurality of first communication addresses that have been set.

A program according to yet another aspect of the present disclosure is designed to cause one or more processors to perform the auxiliary power supply control method described above.

The present disclosure achieves the advantage of enabling manufacturing and managing a plurality of electrical storage devices without identifying the electrical storage devices by their communication addresses.

DESCRIPTION OF EMBODIMENTS

Embodiment (Overview)

An auxiliary power supply system 1 according to an exemplary embodiment of the present disclosure will now be described in detail with reference to the accompanying drawings. Note that the embodiment to be described below are only an example of the present disclosure and should not be construed as limiting. Rather, the exemplary embodiment may be readily modified in various manners depending on a design choice or any other factor without departing from a true spirit and scope of the present disclosure.

Figure 1:
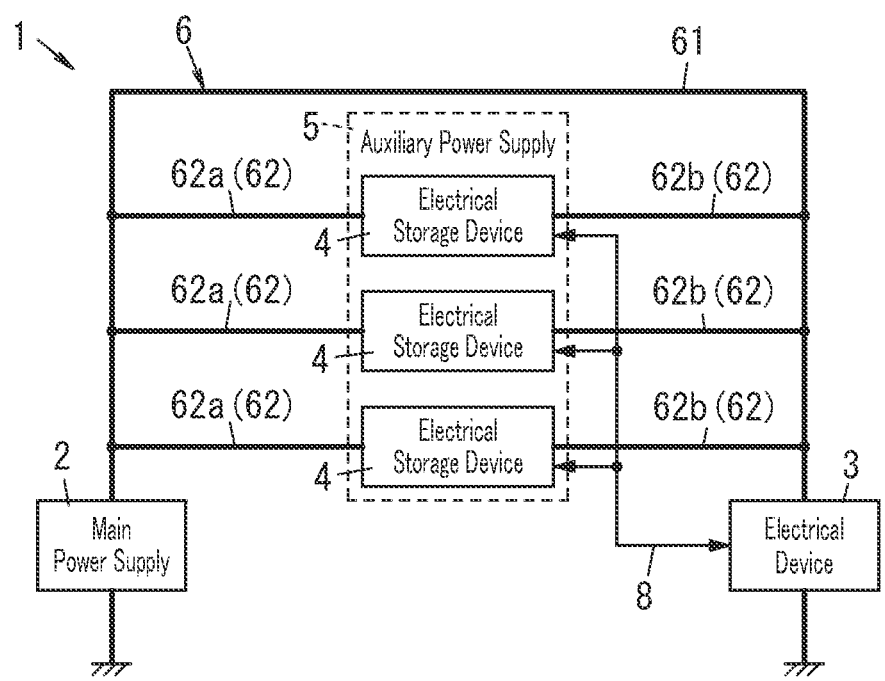
FIG. 1 is a block diagram of an auxiliary power supply system according to an exemplary embodiment.

As shown in FIG. 1, the auxiliary power supply system 1 may be installed in, for example, an automobile. If a main power supply 2 has caused a failure (such as failure to supply power), the auxiliary power supply system 1 supplies, instead of the main power supply 2, power from an auxiliary power supply 5 to an electrical device 3. This allows the electrical device 3 to operate continuously with the power supplied from the auxiliary power supply 5 even if the main power supply 2 is unable to supply power. In the following description of embodiments, a situation where the auxiliary power supply system 1 is installed in the automobile will be described as an example. However, this is only an example and should not be construed as limiting. Alternatively, the auxiliary power supply system 1 may also be installed in any other moving vehicle (such as an aircraft, a watercraft, or a railway train), instead of the automobile.

In this embodiment, the auxiliary power supply 5 is made up of a plurality of electrical storage devices 4. This allows the specification (such as the capacity or output value) of the auxiliary power supply 5 to be easily changed, according to the specification required by the automobile in which the auxiliary power supply 5 is installed, by changing the number of the electrical storage devices 4 provided. In addition, a communication address is assigned to each of the plurality of electrical storage devices 4. This allows the plurality of electrical storage devices 4 to be identified from each other and controlled on an individual basis by the electrical device 3, for example. Identifying the plurality of electrical storage devices 4 in this manner makes the conditions of the plurality of electrical storage devices 4 recognizable on an individual basis. This allows self-diagnosis to be carried out on the plurality of electrical storage devices 4 on an individual basis. In addition, this also enables, when notification has come from an unknown one of the electrical storage devices 4 that has caused an error, determining which of the electrical storage devices 4 has sent the notification. Furthermore, this also allows the voltage at a module in each of the plurality of electrical storage devices 4 to be controlled on an individual basis.

Furthermore, according to this embodiment, communication addresses are assigned to the plurality of electrical storage devices 4 after the plurality of electrical storage devices 4 have been connected to the auxiliary power supply system 1 and before normal communication is established via a communications line 8 between the electrical device 3 and the plurality of electrical storage devices 4. This enables manufacturing and managing the plurality of electrical storage devices 4 even without identifying the electrical storage devices 4 by their communication addresses. This reduces the chances of the inventory of the electrical storage devices 4 becoming redundant or limited depending on the communication addresses, thus making it easier to manage the inventory of the electrical storage devices 4. As used herein, the "normal communication" also refers communication established between the electrical device 3 and the plurality of electrical storage devices 4 to allow the auxiliary power supply 5 (i.e., the plurality of electrical storage devices 4) to supply power to the electrical device 3 when the main power supply 2 has caused a failure. In addition, the "normal communication" as used herein further includes communication established to transmit various types of control instructions from the electrical device 3 to the plurality of electrical storage devices 4.

In this embodiment, the electrical device 3 is a backup target for the plurality of electrical storage devices 4. In addition, the plurality of electrical storage devices 4 supplies power to the same backup target (i.e., the electrical device 3). Furthermore, in this embodiment, the electrical device 3 and the plurality of electrical storage devices 4 operate on, for example, master/slave scheme in cooperation with each other. Specifically, the electrical device 3 serves as a master device and the plurality of electrical storage devices 4 serves as slave devices. The configuration and operation of the auxiliary power supply system 1 will now be described in detail.

(Configuration)

As shown in FIG. 1, the auxiliary power supply system 1 includes the main power supply 2, the electrical device 3, and the plurality of (e.g., three) electrical storage devices 4 that form the auxiliary power supply 5. The auxiliary power supply system 1 further includes a power feeding line 6 and the communications line 8. Note that at least one of the main power supply 2 or the electrical device 3 may be counted out of the constituent elements of the auxiliary power supply system 1.

(Power Feeding Line)

The power feeding line 6 is an electrical path for supplying the output power of the main power supply 2 to the electrical device 3 and the plurality of electrical storage devices 4. The power feeding line 6 includes a first power feeding line 61 and a plurality of second power feeding lines 62.

The first power feeding line 61 is an electrical path for supplying the output power of the main power supply 2 directly to the electrical device 3. The first power feeding line 61 is provided to directly connect the main power supply 2 to the electrical device 3. The plurality of second power feeding lines 62 are electrical paths provided one to one for the plurality of electrical storage devices 4. Each of the second power feeding lines 62 is an electrical path for supplying the output power of the main power supply 2 to the electrical device 3 via a corresponding one of the electrical storage devices 4. The plurality of second power feeding lines 62 are each provided to branch from the first power feeding line 61 and be confluent with the first power feeding line 61 via a corresponding one of the electrical storage devices 4. Each of the second power feeding lines 62 includes a third power feeding line 62a and a fourth power feeding line 62b. The third power feeding line 62a is a part connecting a power input section of the corresponding electrical storage device 4 to the first power feeding line 61.

The fourth power feeding line 62b is a part connecting a power output section of the corresponding electrical storage device 4 to the first power feeding line 61. The third power feeding line 62a is an electrical path for supplying the output power of the main power supply 2 to the electrical storage device 4. The fourth power feeding line 62b is an electrical path for supplying the output power of the electrical storage device 4 to the electrical device 3.

(Communications Line)

The communications line 8 is an electrical path for establishing communication (such as bus communication) between the electrical device 3 and the plurality of electrical storage devices 4. The electrical device 3 and the plurality of electrical storage devices 4 are connected to the communications line 8.

(Main Power Supply)

The main power supply 2 may be, for example, a chargeable and dischargeable storage battery (such as a battery). The main power supply 2 supplies its output power to not only the electrical device 3 via the first power feeding line 61 but also the plurality of electrical storage devices 4 via the plurality of second power feeding lines 62.

(Electrical Device)

The electrical device 3 is an exemplary backup target for the auxiliary power supply 5. The electrical device 3 does not have to be a device but may also be a system as well. The electrical device 3 operates with the power supplied from the main power supply 2 when the main power supply 2 is a normal condition and operates with the power supplied from the auxiliary power supply 5 (i.e., the plurality of electrical storage devices 4) when the main power supply 2 is in an abnormal condition. The electrical device 3 may be, for example, in-vehicle equipment installed in a vehicle. Specifically, the electrical device 3 may be, for example, a braking system or a steering system. The braking system is a system for controlling the brake device of an automobile in accordance with the driver's operation of its brake pedal and based on the results of detection of various types of sensors. The steering system is a system for controlling steering of the automobile in accordance with the driver's handling of its steering wheel and based on the results of detection of various types of sensors.

Figure 2:
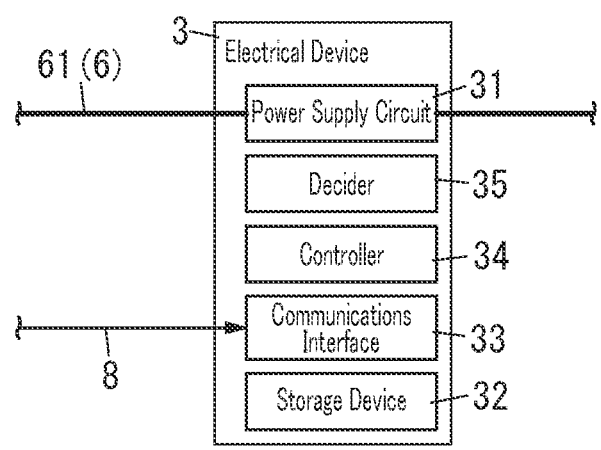
FIG. 2 is a block diagram of an electrical device included in the auxiliary power supply system.

As shown in FIG. 2, the electrical device 3 includes a power supply circuit 31, a storage device 32, a communications interface 33, a controller 34, and a decider 35.

The power supply circuit 31 is connected to the first power feeding line 61 and supplies the power provided via the first power feeding line 61 to respective parts (namely, the storage device 32, the communications interface 33, the controller 34, and the decider 35) of the electrical device 3.

The communications interface 33 communicates with the respective communications interfaces 43 of the plurality of electrical storage devices 4 via the communications line 8. The communications interface 33 is connected to the respective communications interfaces 43 of the plurality of electrical storage devices 4 via the communications line 8. The communications interface 33 may adopt a bus communications system, for example. As the bus communications system, an in-vehicle network (such as the Local Interconnect Network (LIN) or an extended system of LIN) may be adopted, for example. Note that the specification according to the extended system may fall outside of the range defined by the LIN scheme. According to the bus communications system, unicast communication may be established with the communications partner by specifying the communication address of the communications partner. This allows the communications interface 33 to establish unicast communication with the communications interface 43 of each electrical storage device 4 after the communication address to be used by the electrical storage device 4 itself (i.e., its own communication address) has been set (fixed). As used herein, the "unicast communication" refers to one to one communication to be established by specifying a single communication address.

The storage device 32 is a nonvolatile storage device (such as a flash memory) in which data stored is rewritable. In the storage device 32, stored are a plurality of communication addresses for use in communication via the communications line 8. The plurality of communication addresses includes a plurality of first communication addresses for the electrical storage devices 4 and a single second communication address for the electrical device 3. Each of the first communication addresses is used to make an associated electrical storage device 4 set its own communication address. The second communication address is used to make the electrical device 3 set its own communication address.

More specifically, a single communication address is stored as the second communication address in the storage device 32. In addition, the communication addresses of a maximum number of electrical storage devices 4 that can be connected to the auxiliary power supply 5 are stored as the plurality of first communication addresses in the storage device 32. Out of the plurality of first communication addresses stored in the storage device 32, only a required number of (i.e., as many as the electrical storage devices 4) communication addresses are set as communication addresses to be actually used in communication via the communications line 8.

The controller 34 controls the power supply circuit 31 and the communications interface 33. In addition, the controller 34 also sets the plurality of first communication addresses and the single second communication address to be actually used in communication via the communications line 8. More specifically, the controller 34 may, for example, calculate the electrical energy to be used by the electrical device 3 and determine the number of (e.g., three) electrical storage devices 4 required to provide the electrical energy thus calculated. Then, the controller 34 selects the same number of first communication addresses as the number of electrical storage devices 4 required thus determined from the plurality of first communication addresses stored in the storage device 32 and sets the first communication addresses selected as first communication addresses to be used actually. That is to say, the number of the first communication addresses that have been set agrees with the number of the electrical storage devices 4 connected to the auxiliary power supply 5. Note that at this stage, it has not been determined yet which first communication address is to be assigned to which electrical storage device 4. In this embodiment, the required number of electrical storage devices 4 have been connected by the worker to the auxiliary power supply 5. The controller 34 sets the second communication address that has been stored in advance in the storage device 32 as the second communication address to be actually used. In this manner, the controller 34 sets a plurality of communication addresses (namely, the plurality of first communication addresses and the single second communication address) to be actually used in communication via the communications line 8.

When the auxiliary power supply system 1 is started up, the controller 34 sets the plurality of communication addresses (namely, the plurality of first communication addresses and the single second communication address) to be actually used in communication via the communications line 8 as described above. The controller 34 determines the order (predetermined order) of the plurality of communication addresses (namely, the plurality of first communication addresses and the single second communication address) that have been set as described above. For example, the controller 34 may determine the second communication address to be the first address, and then determine the plurality of (e.g., three) first communication addresses to be the second, third, and fourth addresses, respectively.

The controller 34 adds the plurality of communication addresses that have been set as described above (namely, the plurality of first communication addresses and the single second communication address) one by one to respective headers of transmission signals in the order thus determined and transmits (broadcasts), via the communications line 8, the transmission signals to the plurality of electrical storage devices 4 in the order thus determined. Specifically, the controller 34 transmits a transmission signal, to which the second communication address defined as the first one in the order determined is added, as the first transmission signal. Next, the controller 34 transmits a transmission signal, to which the first communication address defined as the second one in the order determined is added, as the second transmission signal. Thereafter, the controller 34 transmits a transmission signal, to which the first communication address defined as the third one in the order determined is added, as the third transmission signal. Finally, the controller 34 transmits a transmission signal, to which the first communication address defined as the fourth one in the order determined is added, as the fourth transmission signal.

The controller 34 goes through multiple repetitive cycles, in each of which the plurality of communication addresses (namely, the plurality of first communication addresses and the single second communication address) are transmitted in the order described above. By going through these multiple repetitive cycles of transmission, the plurality of first communication addresses may be assigned to the respective electrical storage devices 4 to prevent the same communication address from overlapping between the plurality of electrical storage devices 4. That is to say, by going through the multiple repetitive cycles of transmission, each of the plurality of electrical storage devices 4 determines (fixes) the communication address to be used by itself in the communication via the communications line 8 (i.e., its own communication address) out of the plurality of first communication addresses to avoid overlap with any other electrical storage device 4 as will be described later.

The controller 34 monitors how other devices (i.e., the plurality of electrical storage devices 4) use their own communication addresses in the communication via the communications line 8, thereby finding unused communication addresses out of the plurality of first communication addresses that have been set. As used herein, the "unused communication address" refers to a communication address (first communication address) that has not been provisionally selected by any of the plurality of electrical storage devices 4. In other words, the unused communication address refers to a communication address that has not been used yet as the communication address of the source in the communication via the communications line 8. When finding that there are no unused communication addresses anymore in the plurality of first communication addresses that have been set, the controller 34 ends the multiple repetitive cycles of transmission and starts the normal communication. Note that instead of ending the multiple repetitive cycles of transmission when finding that there are no unused communication addresses anymore, the controller 34 may end the multiple repetitive cycles of transmission and start the normal communication on receiving notification, from every one of the electrical storage devices 4, indicating its own communication address that has been fixed.

The controller 34 controls the output voltage of each electrical storage device 4 in accordance with a control instruction transmitted from the communications interface 33. For example, the controller 34 increases or decreases the output voltage of each electrical storage device 4 in accordance with the control instruction transmitted from the communications interface 33. In addition, the controller 34 may also perform control to equalize the output voltages of all the electrical storage devices 4 (with the highest output voltage).

The decider 35 determines, based on the voltage applied to the first power feeding line 61, whether the main power supply 2 is operating properly or not (i.e., whether the main power supply 2 has any defect or not). In this embodiment, when finding the voltage applied to the first power feeding line 61 equal to or higher than a threshold value, for example, the decider 35 may decide that the main power supply 2 be operating properly (i.e., have no defect). On the other hand, when finding the voltage applied to the first power feeding line 61 less than the threshold value, the decider 35 may decide that the main power supply 2 be operating improperly (i.e., have a defect).

If the decider 35 decides that the main power supply 2 be operating properly, then the controller 34 makes the communications interface 33 transmit a control instruction to the respective electrical storage devices 4 to instruct the respective electrical storage devices 4 to stop supplying power to the electrical device 3. On the other hand, if the decider 35 decides that the main power supply 2 be operating improperly, then the controller 34 makes the communications interface 33 transmit a control instruction to the respective electrical storage devices 4 to instruct the respective electrical storage devices 4 to start supplying power to the electrical device 3.

In this embodiment, the electrical device 3 (more exactly, the decider 35 thereof) determines whether the main power supply 2 is operating properly or not. However, this is only an example and should not be construed as limiting. Alternatively, each electrical storage device 4 may determine, instead of the electrical device 3, whether the main power supply 2 is operating properly or not. In that case, if each electrical storage device 4 decides that the main power supply 2 be operating improperly, the electrical storage device 4 automatically starts supplying power to the electrical device 3 via the associated with fourth power feeding line 62b.

If the electrical device 3 is a braking system of an automobile, the controller 34 controls the brake device of the automobile in accordance with the driver's operation of its brake pedal and based on the results of detection of various types of sensors. On the other hand, if the electrical device 3 is a steering system of an automobile, then the controller 34 controls steering of the automobile in accordance with the driver's handling of its steering wheel and based on the results of detection of various types of sensors.

In this embodiment, the communications interface 33, the controller 34, and the decider 35 are implemented as, for example, a microcomputer (processor) including a CPU and a memory as principal constituent elements thereof. In other words, the communications interface 33, the controller 34, and the decider 35 are implemented as a computer including a CPU and a memory. The computer performs the functions of the communications interface 33, the controller 34, and the decider 35 by making the CPU execute a program stored in the memory. In this embodiment, the program is stored in advance in the memory. Alternatively, the program may also be downloaded via a telecommunications line such as the Internet or distributed after having been stored in a storage medium such as a memory card.

(Electrical Storage Device)

Figure 3:
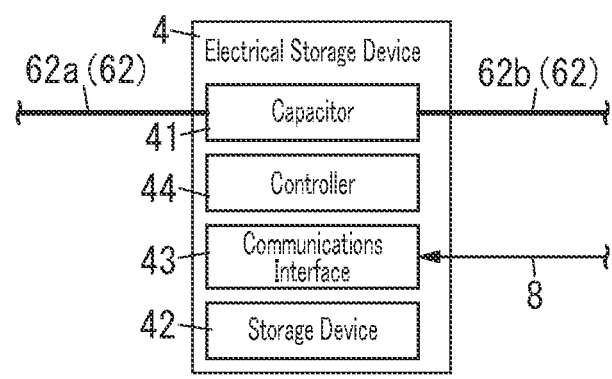
FIG. 3 is a block diagram of an electrical storage device included in the auxiliary power supply system.

As shown in FIG. 3, each of the electrical storage devices 4 is a constituent element of the auxiliary power supply 5 that supplies power to the electrical device 3 (as backup target and the same communications partner) when the main power supply 2 is in an abnormal condition. On the other hand, when the main power supply 2 is in normal condition, the electrical storage device 4 stores the power supplied from the main power supply 2 via the third power feeding line 62a and supplies the power thus stored to the electrical device 3 via the fourth power feeding line 62b in accordance with a control instruction that the electrical storage device 4 has received from the electrical device 3 via the communications line 8. In this embodiment, the plurality of electrical storage devices 4 are connected together in parallel.

At the time of manufacturing of the electrical storage devices 4, communication addresses for use in communication via the communications line 8 (i.e., their own communication addresses) are not assigned to the electrical storage devices 4. Thus, at the manufacturing stage, the plurality of electrical storage devices 4 have quite the same configuration. As will be described later, after the electrical storage devices 4 have been connected to the auxiliary power supply 5 (i.e., after the electrical storage devices 4 have been manufactured), their own communication addresses are automatically set (fixed) for the electrical storage devices 4 as the electrical device 3 goes through the multiple repetitive cycles of transmission described above.

Each electrical storage device 4 includes a capacitor 41, a storage device 42, a communications interface 43, and a controller 44.

The capacitor 41 is a component that stores the electricity supplied from the main power supply 2 via the third power feeding line 62a. The capacitor 41 may be, for example, an electrical double layer capacitor or an energy polymer capacitor.

The storage device 42 is a nonvolatile storage device (such as a flash memory) in which data stored is rewritable. In the storage device 42, stored is a bit sequence indicating a manufacturing number unique to the electrical storage device 4.

The communications interface 43 is connected to the communications line 8 and communicates with the other electrical storage devices 4 and the electrical device 3 (e.g., establishes bus communication) via the communications line 8. The respective communications interfaces 43 of the plurality of electrical storage devices 4 have the communications capability of communicating with an identical communications partner (i.e., the electrical device 3).

The controller 44 controls the communications interface 43. In addition, the controller 44 monitors how other devices (i.e., the plurality of electrical storage devices 4 and the electrical device 3) use their own communication addresses in the communication via the communications line 8, thereby finding the other devices' communication addresses which are already used in the communication via the communications line 8.

The controller 44 receives the transmission signals from the electrical device 3 via the communications interface 43. In the interval between reception of a transmission signal, to which the second communication address is added, and the next reception of a transmission signal, to which the second communication address is added, while the electrical device 3 goes through the multiple repetitive cycles of transmission, the controller 44 monitors respective first addresses added to the plurality of transmission signals transmitted from the electrical device 3. Note that the second communication address is supposed to be known in advance to the controller 44. That is to say, the second communication address has been set in advance in the controller 44. By monitoring the first addresses as described above, the controller 44 acquires information about a set of first communication addresses that have been set by the controller 34 of the electrical device 3 in, for example, the first cycle of the multiple repetitive cycles of transmission.

For example, in the first cycle of the multiple repetitive cycles of transmission that the electrical device 3 is going through, the controller 44 provisionally selects the communication address (i.e., the first communication address) added to the header of the second transmission signal (i.e., the transmission signal to be received next to the first transmission signal to which the second communication address is added) as its own communication address. As used herein, to be "provisionally selected" refers to a situation where its own communication address has been selected as a readily changeable one. Then, every time the controller 44 receives a transmission signal, to which the provisional communication address of its own is added, from the second cycle and on, for example, of the multiple repetitive cycles of transmission, the controller 44 returns a response signal to the electrical device 3 in reply to the transmission signal received. In this embodiment, the response signal is returned by unicast transmission from each electrical storage device 4 to the electrical device 3. However, this is only an example and should not be construed as limiting. Alternatively, the response signal may also be returned by broadcast transmission from the electrical storage device 4 to the electrical device 3.

If any communication error occurs while the response signal is returned, then the controller 44 changes the provisional communication address of its own into one of one or more unused communication addresses belonging to the plurality of first communication addresses that have been set as described above. As used herein, the "unused communication address" refers to a communication address that has not been provisionally selected in any of the plurality of electrical storage devices 4. In other words, the unused communication address refers to a communication address that is not used as the communication address of the source in the communication via the communications line 8.

On the other hand, if no communication error occurs while the response signal is returned, then the controller 44 does not change, but continues to use, the provisional communication address of its own. Also, if no communication error occurs while the response signal is returned and the plurality of first communication addresses that have been set as described above includes no unused communication addresses, then the controller 44 decides that the plurality of first communication addresses that have been set as described above have been assigned to the plurality of electrical storage devices 4 without any overlap and regards the provisional communication address of its own as a final (i.e., formally determined) one.

In this embodiment, when one electrical storage device 4 returns a transmission signal, a response signal may be returned from another electrical storage device 4, which shares the same communication address with the one electrical storage device as the provisional communication address of their own. In that case, a communication error may occur while one of these two electrical storage devices 4 is returning the response signal. That is to say, the electrical storage device 4 returns a response signal that may cause such a communication error.

More specifically, each electrical storage device 4 returns either a first response signal or a second response signal as the response signal. The first response signal is a response signal that causes, when a response signal (which is either the first response signal or the second response signal) is returned from another electrical storage device 4 that shares the same first communication address with a given electrical storage device as their own communication address, no communication error while the given electrical storage device 4 is returning the first response signal. The second response signal is a response signal that causes, when a response signal (the second response signal) is returned from another electrical storage device 4 that shares the same first communication address with a given electrical storage device as their own communication address, no communication error while the given electrical storage device 4 is returning the second response signal. The second response signal is also a response signal that causes, if one electrical storage device 4 returns a response signal with its own communication address added thereto while another electrical storage device 4 is returning a first response signal to which the same communication address of its own is added, a communication error while the former electrical storage device 4 is returning the second response signal.

The first response signal may be, for example, data "0x00" in hexadecimal representation, and the second response signal may be, for example, data "0xFF" in hexadecimal representation. When communication is established via the LIN, for example, the data 0x00 is transmitted by lowering the potential on the communications line 8 to the ground potential (low potential), while the data 0xFF is transmitted by maintaining the potential on the communications line 8 at a high potential. When these data are transmitted simultaneously, transmission of the data 0x00 is given the higher priority and the data 0xFF is not transmitted. Suppose a situation where when a plurality of electrical storage devices 4 transmit response signals with the same communication address of their own added thereto, one electrical storage device 4 transmits data 0x00 as the response signal and another electrical storage device transmits data 0xFF as the response signal. In that case, the data 0x00 is transmitted normally but the data 0xFF is not transmitted, thus causing a communication error (communication breakdown) at the source end.

In this embodiment, each electrical storage device 4 determines at random, by using the bit sequence stored in the storage device 42 and representing the manufacturing number, which of the first response signal (e.g., 0x00) or the second response signal (e.g., 0xFF) is going to be returned as the response signal. More specifically, if a bit at a particular bit position in the bit sequence representing the manufacturing number is zero, then the electrical storage device 4 returns the first response signal as the response signal. On the other hand, if a bit at the particular bit position is one, then the electrical storage device 4 returns the second response signal as the response signal. The electrical storage device 4 shifts, whenever transmitting the response signal, the particular bit position by one bit from a bit position at one end (e.g., the right end) of the bit sequence toward a bit position at the other end (e.g., the left end) of the bit sequence. This allows the electrical storage device 4 to change, at random, the response signal to return from the first response signal into the second response signal, or vice versa, whenever transmitting the response signal.

The controller 44 does not store its own communication address thus fixed in the storage device 42. Thus, when the electrical storage device 4 is shut down, the controller 44 erases its own communication address thus fixed. Whenever the electrical device 3 goes through one of the multiple repetitive cycles of transmission after the electrical storage device 4 has been started up, the controller 44 fixes the communication address of its own as described above.

In accordance with the control instruction that the controller 44 has received from the electrical device 3 via the communications line 8, the controller 44 starts and stops supplying power to the electrical device 3 via the fourth power feeding line 62b. In addition, in accordance with the control instruction that the controller 44 has received from the electrical device 3 via the communications line 8, the controller 44 increases and decreases the voltage to be output to the electrical device 3 via the fourth power feeding line 62b.

In this embodiment, the communications interface 43 and the controller 44 are implemented as, for example, a microcomputer (processor) including a CPU and a memory as principal constituent elements thereof. In other words, the communications interface 43 and the controller 44 are implemented as a computer including a CPU and a memory. The computer performs the functions of the communications interface 43 and the controller 44 by making the CPU execute a program stored in the memory. In this embodiment, the program is stored in advance in the memory. Alternatively, the program may also be downloaded via a telecommunications line such as the Internet or distributed after having been stored in a storage medium such as a memory card.

(Operation)
(Outline of operation)

Figure 4:
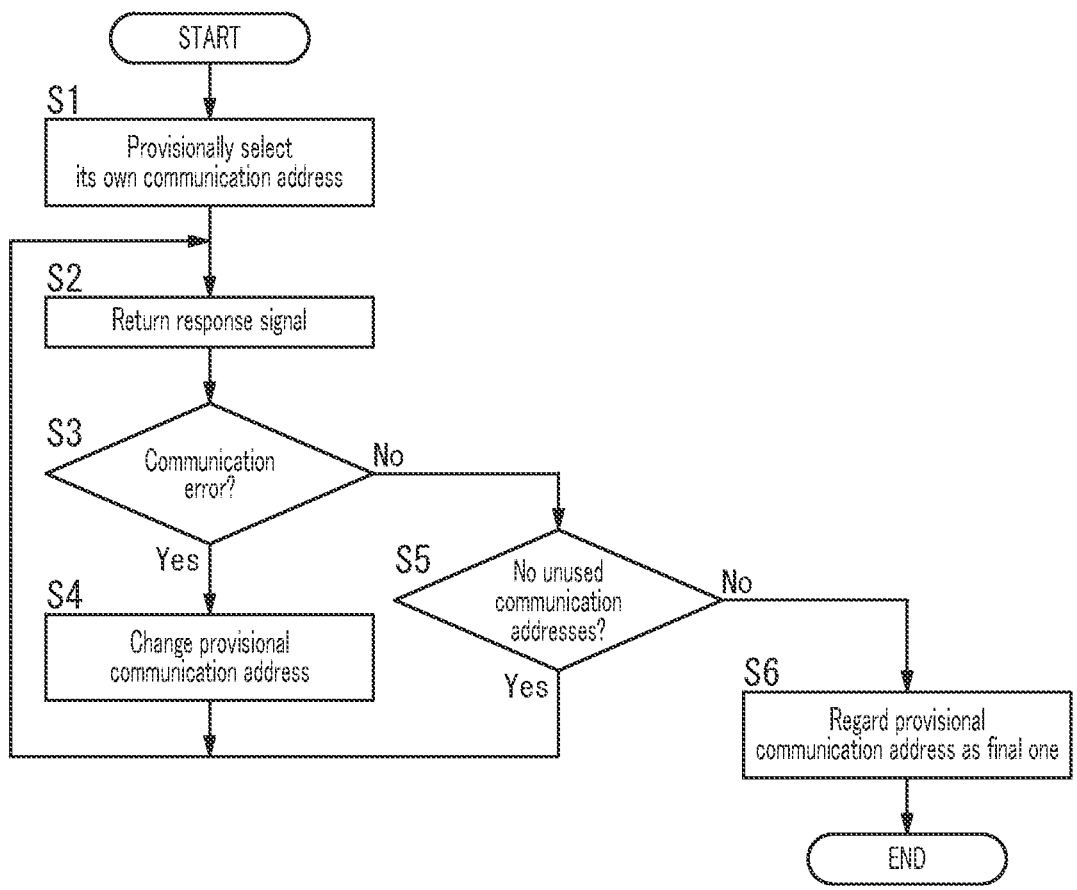
FIG. 4 is a flowchart showing an outline of the procedure of operation of the auxiliary power supply system.

Next, an operating procedure of the auxiliary power supply system 1 will be outlined with reference to FIG. 4. More specifically, the operation of electrical storage devices 4 when setting (fixing) their own communication address will be outlined.

A plurality of electrical storage devices 4 are connected to the auxiliary power supply system 1. In this state, no communication addresses of their own for use in communication via the communications line 8 have been set (fixed) yet for the plurality of electrical storage devices 4. Each of the electrical storage devices 4 monitors the status of communication on the communications line 8 to wait for the electrical device 3 to repeatedly transmit, in a predetermined order, a plurality of communication addresses (including a plurality of first communication addresses and a single second communication address) for use in communication via the communications line 8. When receiving a transmission signal that has been transmitted next to the transmission signal to which the second communication address is added while the electrical device 3 goes through, for example, the first cycle of the multiple repetitive cycles of transmission, the electrical storage device 4 provisionally selects, as its own communication address, the communication address (i.e., the first communication address) added to the next transmission signal (in Step S1).

In the provisionally selecting step S1, the same first communication address is provisionally selected as the communication address of their own for every one of the plurality of electrical storage devices 4. Thus, at this stage, the communication addresses of their own that have been provisionally selected for the plurality of electrical storage devices 4 overlap with each other.

Thereafter, when receiving a transmission signal, to which the provisional communication address of its own is added, while the electrical device 3 goes through, for example, the second cycle of the multiple repetitive cycles of transmission, each electrical storage device 4 returns a response signal in reply to the transmission signal received (in Step S2). At this time, the electrical storage device 4 selects at random either the first response signal (e.g., data 0x00 in hexadecimal representation) or the second response signal (e.g., data 0xFF in hexadecimal representation) as the response signal and returns the response signal thus selected.

If a communication error has occurred while the response signal is being returned (if the answer is YES in Step S3), then the electrical storage device 4 changes the provisional communication address of its own into one of the one or more unused communication addresses (in Step S4). More specifically, the electrical storage device 4 monitors how other devices use the communication addresses of their own in the communication and confirms a set of first communication addresses that have been set by the electrical device 3 for use in the communication during, for example, the first cycle out of the multiple repetitive cycles of transmission. Then, the electrical storage device 4 finds, by that monitoring, the first communication address that has already been used in the communication (i.e., the first communication address that has been provisionally selected by any one of the electrical storage devices 4 as the communication address of its own). In this manner, the electrical storage device 4 finds the unused communication addresses in the set of first communication addresses and changes the provisional communication address of its own into one of the unused communication addresses thus found. Then, the process goes back to Step S2.

On the other hand, if no communication error has occurred while the response signal is being returned (i.e., if the answer is NO in Step S3), the electrical storage device 4 monitors how the other devices use communication addresses of their own in the communication. In this manner, the electrical storage device 4 determines whether the set of first communication addresses includes no unused communication address (in Step S5). If a decision is made in Step S5 that there is any unused communication address (if the answer is YES in Step S5), then the electrical storage device 4 decides that the plurality of first communication addresses thus set have not been assigned to the plurality of electrical storage devices 4 without overlap, and the process goes back to the processing step S2. On the other hand, if a decision is made in Step S5 that the set of first communication addresses include no unused communication addresses (if the answer is NO in Step S5), then the electrical storage device 4 decides that the plurality of first communication addresses thus set have been assigned to the plurality of electrical storage devices 4 without overlap and regards the provisional communication address of its own as a final one (in Step S6) to end the process.

According to the operating procedure described above, whenever receiving a transmission signal to which the provisional communication address of its own is added while the electrical device 3 goes through the multiple repetitive cycles of transmission, each of the plurality of electrical storage devices 4 returns a response signal (in Step S2). Also, every time any communication error occurs while the response signal is being returned (in Step S3), each of the plurality of electrical storage devices 4 changes the provisional communication address of its own into one of the one or more unused communication addresses (in Step S4). This allows the overlap in their own communication addresses between the plurality of electrical storage devices 4 to be gradually eliminated while the electrical device 3 goes through the multiple repetitive cycles of transmission. Then, when the set of first communication addresses no longer has any unused communication addresses, it turns that mutually different first communication addresses have been assigned to all of the plurality of electrical storage devices 4. In that case, each electrical storage device 4 regards the provisional communication address of its own as a final one (in Step S6) to end the process.

(Details of operation)

Next, a detailed operating procedure of the auxiliary power supply system 1 will be described with reference to FIG. 5. That is to say, the operating procedure that has been described with reference to FIG. 4 will be described in further detail.

The electrical device 3 sets a plurality of communication addresses (including a plurality of first communication addresses and a single second communication address) for use in communication via the communications line 8. Then, the electrical device 3 adds, one by one, the plurality of communication addresses that have been set as described above to respective headers of transmission signals in a predetermined order (i.e., in the order determined in advance) and transmits (by broadcasts), in the communication via the communications line 8, one of the transmission signals after another to the plurality of electrical storage devices 4. With the transmissions of the transmission signals defined as one cycle, the electrical device 3 goes through multiple repetitive cycles of transmission.

Each of the electrical storage devices 4 provisionally selects, as the communication address of its own, the communication address added to the transmission signal that the electrical storage device 4 has received next to the transmission signal to which the second communication address is added (in Step S100). In this embodiment, every one of the plurality of electrical storage devices 4 provisionally selects, as the communication address of its own, the first communication address added to the transmission signal that has been received next. Thus, at this stage, every one of the plurality of electrical storage devices 4 has provisionally selected the same first communication address as the communication address of their own.

Also, during, for example, the first cycle of the multiple repetitive cycles of transmission, the electrical storage device 4 receives the plurality of transmission signals that the electrical device 3 has transmitted in a predetermined order Then, the electrical storage device 4 acquires, from the communication addresses (i.e., first communication addresses) added to these transmission signals, information about the set of communication addresses that have been set by the electrical device 3. In this manner, the electrical storage device 4 confirms the set of first communication addresses for use on the communications line 8 (i.e., communication addresses for the electrical storage device 4) (in Step S100).

Then, the electrical storage device 4 waits for a transmission signal to come from the electrical device 3 in the communication via the communications line 8. In this manner, the electrical storage device 4 waits to receive the communication addresses (including the first communication addresses and the second communication address) from the electrical device 3 (in Step S101).

Thereafter, on receiving a transmission signal from the electrical device 3, the electrical storage device 4 determines whether the communication address added to the transmission signal agrees with the provisional communication address of its own (in Step S102). If a decision is made in Step S102 that the communication address received agree with the provisional communication address of its own (if the answer is YES in Step S102), then the electrical storage device 4 returns a response signal to the transmission signal received (in Step S103). More specifically, if the bit at a particular bit position of the bit sequence stored in the storage device 42 and representing the manufacturing number is zero, the electrical storage device 4 returns a first response signal (such as 0x00) as the response signal. On the other hand, if the bit at the particular bit position is one, then the electrical storage device 4 returns a second response signal (such as 0xFF) as the response signal.

If a communication error has occurred while the response signal is being returned (if the answer is YES in Step S104), then the electrical storage device 4 changes the provisional communication address of its own into one of the one or more unused communication addresses belonging to the plurality of first communication addresses that have been confirmed in Step S101 (in Step S105). More specifically, the electrical storage device 4 monitors how other devices use the communication addresses of their own on the communications line 8. In this manner, the electrical storage device 4 finds one of the other devices' own communication addresses that is already used in the communication via the communications line 8 (i.e., the first communication address that has been provisionally selected by any one of the electrical storage devices 4 as the communication address of its own). In this manner, the electrical storage device 4 finds, based on the result of finding, the unused communication addresses in the set of first communication addresses that have been confirmed in Step S101. Then, the electrical storage device 4 changes the provisional communication address of its own into one of the unused communication addresses thus found. Thereafter, the electrical storage device 4 returns the particular bit position to the initial position (such as the right end) of the bit sequence (i.e., resets the particular bit position) (in Step S106). Then, the process returns to Step S101.

On the other hand, if no communication error has occurred while the response signal is being returned in Step S103 (if the answer is NO in Step S104), then the process goes back to Step S101.

Meanwhile, if a decision is made in Step S102 that the communication address received disagree with the provisional communication address of its own (if the answer is NO in Step S102), then the electrical storage device 4 determines whether the communication address received agrees with the second communication address (in Step S107). If a decision is made in Step S107 that the communication address received disagree with the second communication address (if the answer is NO in Step S107), the electrical storage device 4 monitors how the other devices' (i.e., the other electrical storage devices' 4) communication addresses are used on the communications line 8. Then, the electrical storage device 4 updates information about the unused communication addresses in the set of first communication addresses that have been confirmed in Step S100 (in Step S108). Thereafter, the process goes back to Step S101.

On the other hand, if a decision is made in Step S107 that the communication address received agree with the second communication address (if the answer is YES in Step S107), then the electrical storage device 4 determines whether the plurality of first communication addresses confirmed in Step S100 includes any unused communication address (in Step S109). If a decision is made in Step S109 that the plurality of first communication addresses confirmed in Step S100 include any unused communication address (if the answer is YES in Step S109), the electrical storage device 4 shifts the particular bit position set for the bit sequence stored in the storage device 42 and representing the manufacturing number by one bit to the left from the current bit position (i.e., from the rightmost bit position toward the leftmost bit position) (in Step S110). Then, the process goes back to Step S101.

On the other hand, if a decision is made in Step S109 that the plurality of first communication addresses confirmed in Step S100 include no unused communication addresses (if the answer is NO in Step S109), then the electrical storage device 4 decides that the plurality of first communication addresses confirmed in Step S100 have been assigned to the plurality of electrical storage devices 4 without any overlap and regards the provisional communication address of its own as a final (i.e., formally determined) one to end the process.

According to the operating procedure described above, Step S100 is performed during, for example, the first cycle of the multiple repetitive cycles of transmission of the plurality of communication addresses (including the first communication addresses and the second communication address) by the electrical device 3, thus provisionally selecting communication addresses of their own for the plurality of electrical storage devices 4. At this stage, the communication addresses of their own that have been provisionally selected for the plurality of electrical storage devices 4 overlap with each other. After that, from, for example, the second cycle and on of the multiple repetitive cycles of transmission, when a communication error occurs while the response signal is being returned, each electrical storage device 4 changes the provisional communication address of its own into one of the unused communication addresses (in Step S105). This allows the overlap of the communication addresses of their own between the plurality of electrical storage devices 4 to be gradually eliminated. Finally, in Step S109, when finding that the plurality of first communication addresses that have been confirmed in Step S100 no longer has unused communication addresses, the electrical storage device 4 decides that there be no overlap in communication addresses of their own between the plurality of electrical storage devices 4 (in Step S111). That is to say, mutually different communication addresses of their own are assigned to the plurality of electrical storage devices 4 to end the process.

In addition, according to the operating procedure described above, if the electrical storage device 4 changes the provisional communication address of its own (in Step S105) and if there are any unused communication addresses when the electrical storage device 4 receives a transmission signal to which the second communication address is added (if the answer is YES in Step S109), then the particular bit position is changed (in Steps S106 and S110). This makes it easier to cause a communication error at an equal probability when the plurality of electrical storage devices 4, of which the communication addresses of their own overlap with each other, return a response signal. This allows the overlap in communication addresses of their own between the electrical storage devices 4 to be eliminated quickly.

Figure 5:
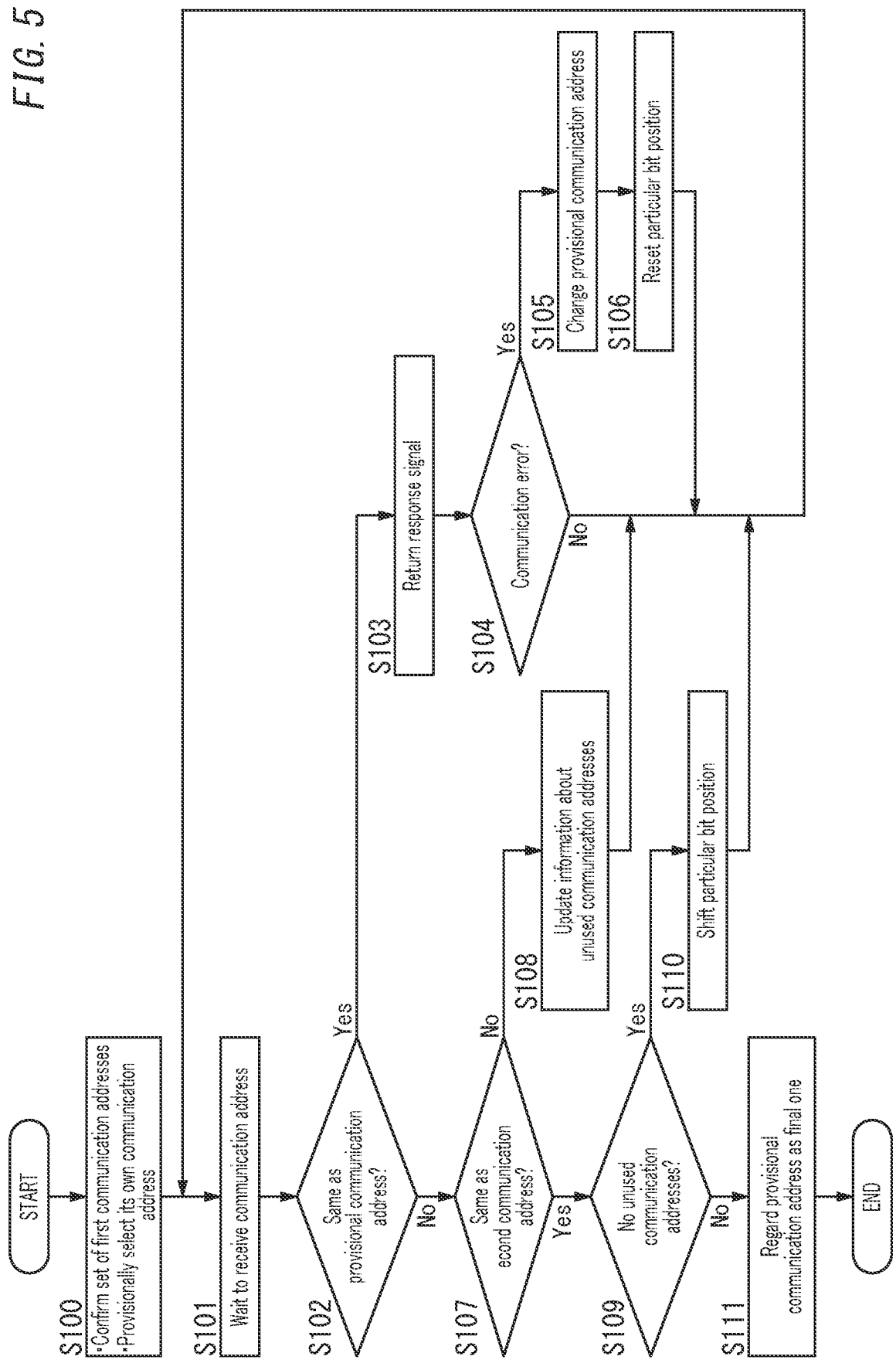
FIG. 5 is a flowchart showing a detailed procedure of operation of the auxiliary power supply system.

(Details of Step S100 in FIG. 5)

Figure 6:
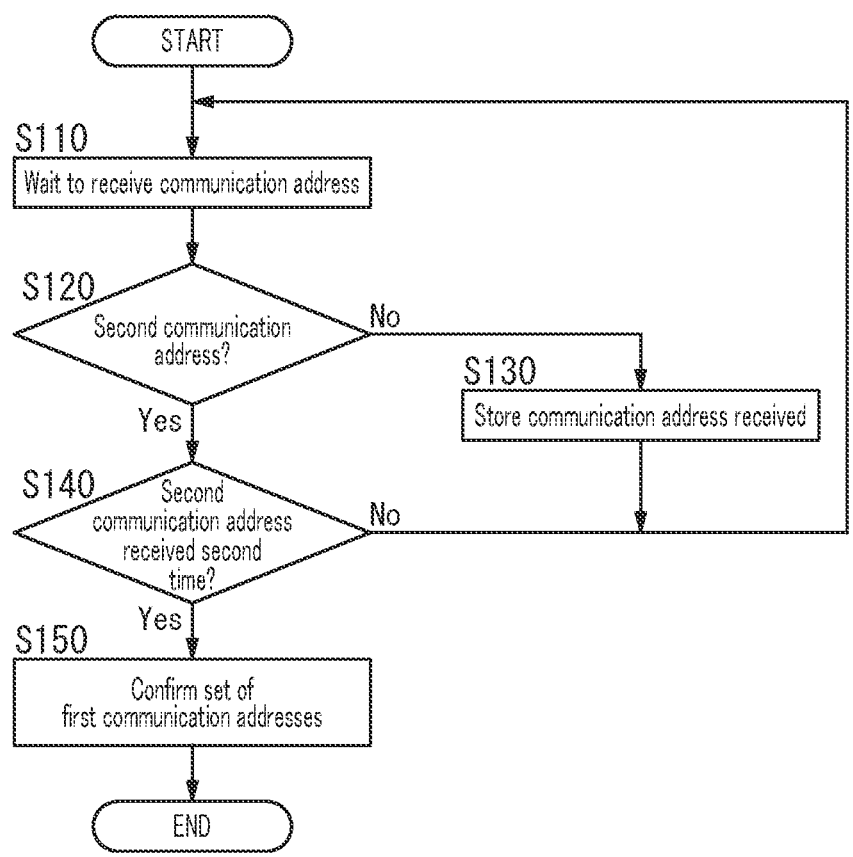
FIG. 6 is a flowchart showing a detailed procedure of Step S100 shown in FIG. 5.

Next, the details of the processing step S100 shown in FIG. 5 (in which the electrical storage device 4 confirms the set of first communication addresses that have been set by the electrical device 3) will be described with reference to FIG. 6.

The electrical storage device 4 waits for a transmission signal to come from the electrical device 3 in the communication via the communications line 8 (in Step S110). That is to say, the electrical storage device 4 waits to receive a communication address added to the transmission signal coming from the electrical device 3 (in Step S110). Thereafter, on receiving the communication address coming from the electrical device 3, the electrical storage device 4 determines whether the communication address received agrees with the second communication address (i.e., whether the communication address received agrees with the second communication address that has been set in advance for the electrical storage device 4) (in Step S120). If a decision is made in Step S120 that the communication address does not agree with the second communication address (if the answer is NO in Step S120), then the electrical storage device 4 regards the communication address thus received as the first communication address and stores the communication address in the storage device 42 (in Step S130). Then, the process goes back to Step S110.

On the other hand, if a decision is made in Step S120 that the communication address thus received agrees with the second communication address (if the answer is YES in Step S120), then the electrical storage device 4 further determines whether the communication address thus received (i.e., the second communication address) is the second communication address that has been received for the second time (in Step S140). If a decision is made in Step S140 that the communication address thus received is not the second communication address received for the second time (if the answer is NO in Step S140), then the process goes back to Step S110.

On the other hand, if a decision is made in Step S140 that the communication address thus received is the second communication address received for the second time (if the answer is YES in Step S140), then the electrical storage device 4 determines the set of first communication addresses stored in Step S130 in the interval between the reception of the second communication address for the first time and the reception of the second communication address for the second time to be the set of first communication addresses that have been set by the electrical device 3 for use in the communication via the communication line 8 (in Step S150). That is to say, the electrical storage device 4 acquires the communication addresses added to the respective transmission signals that the electrical device 3 has transmitted in the interval between reception of a transmission signal to which the second communication address is added and the next reception of a transmission signal to which the second communication address is added, thereby confirming the set of first communication addresses that have been set by the electrical device 3 for use in the communication via the communication line 8. Then, the process ends.

Note that since the second communication address has already been acquired in Step S120, the decision is made in Step S140, using the second communication address thus acquired, whether the communication address has been received for the second time.

In this embodiment, the electrical device 3 repeatedly transmits, in a predetermined order, the plurality of communication addresses (including a plurality of first communication addresses and a single second communication address) that have been set by the electrical device 3 for use in the communication via the communication line 8. Thus, the set of first communication addresses that have been set by the electrical device 3 for use on the communication line 8 may be confirmed based on the plurality of communication addresses (i.e., a plurality of first communication addresses) that have been received in the interval between reception of the second communication address for the first time and reception of the second communication address for the second time.

(Operation of changing particular bit position)

Figure 7:
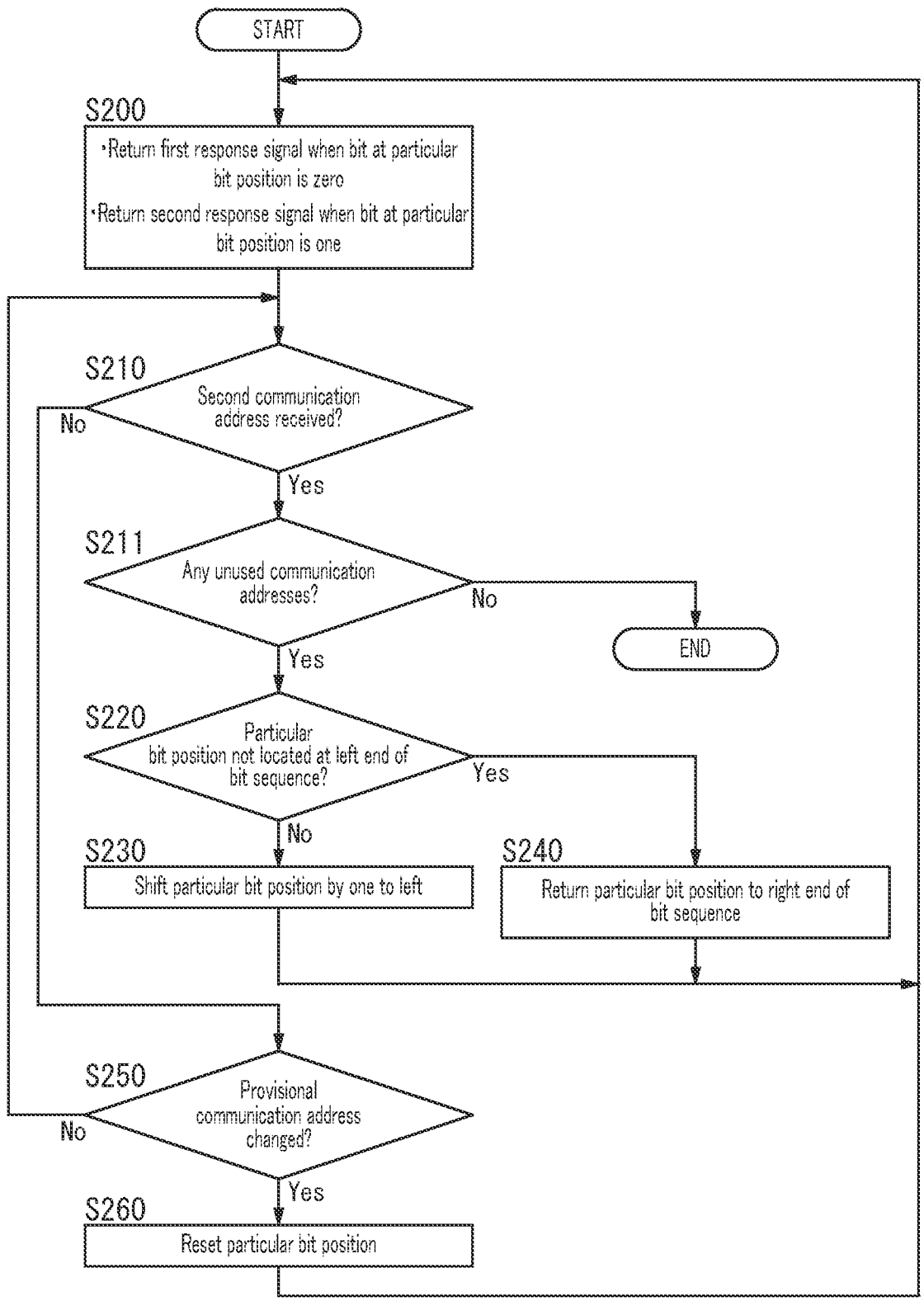
FIG. 7 is a flowchart showing a procedure of operation of changing a particular bit position.

Next, the operation of shifting a particular bit position that has been set in a bit sequence representing the manufacturing number of the electrical storage device 4 will be described with reference to FIG. 7.

If in a bit sequence representing, as a binary number, the manufacturing number stored in the storage device 42, a bit at a particular bit position (initially, a position at a right end (one end) of the bit sequence) is zero, then each electrical storage device 4 returns a first response signal (e.g., 0x00 in hexadecimal representation) as a response signal. On the other hand, if a bit at the particular bit position is one, then the electrical storage device 4 returns a second response signal (e.g., 0xFF in hexadecimal representation) as a response signal (in Step S200).

Then, the electrical storage device 4 determines whether the electrical storage device 4 has received any transmission signal to which the second communication address is added (in other words, whether the electrical storage device 4 has received the second communication address via the transmission signal) (in Step S210). If a decision is made in Step S210 that the electrical storage device 4 have received the second communication address, then the electrical storage device 4 determines whether the plurality of first communication addresses confirmed by the electrical storage device 4 includes any unused communication addresses (in Step S211). If a decision is made in Step S211 that the plurality of first communication addresses confirmed by the electrical storage device 4 includes no unused communication addresses (if the answer is NO in Step S211), then the plurality of first communication addresses have been assigned to the plurality of electrical storage devices 4 without any overlap. Thus, the process ends.

On the other hand, if a decision is made in Step S211 that the plurality of first communication addresses confirmed by the electrical storage device 4 includes any unused communication addresses (if the answer is YES in Step S211), then the electrical storage device 4 determines whether the particular bit position is not located at the left end of a bit sequence representing the manufacturing number (in Step S220). If a decision is made in Step S220 that the particular bit position is not located at the left end of the bit sequence representing the manufacturing number (if the answer is NO in Step S220), then the electrical storage device 4 shifts the particular bit position by one bit to the left (in Step S230). Then, the process goes back to Step S200.

On the other hand, if a decision is made in Step S220 that the particular bit position is located at the left end of the bit sequence representing the manufacturing number (if the answer is YES in Step S220), then the particular bit position is returned to the right end of the bit sequence representing the manufacturing number (in Step S240). Then, the process goes back to Step S200.

Meanwhile, if a decision is made in Step S210 that the electrical storage device 4 has not received the second communication address (if the answer is NO in Step S210), then the electrical storage device 4 determines whether the electrical storage device 4 has changed the provisional communication address of its own (in Step S250). If a decision is made in Step S250 that the electrical storage device 4 has not changed the provisional communication address of its own (if the answer is NO in Step S250), then the process goes back to Step S210. On the other hand, if a decision is made in Step S250 that the electrical storage device 4 has changed the provisional communication address of its own (if the answer is YES in Step S250), then the electrical storage device 4 returns the particular bit position to the right end of the bit sequence representing the manufacturing number (in Step S260). Then, the process goes back to Step S200.

According to the operating procedure described above, if the electrical storage device 4 has received the second communication address and there are any unused communication addresses (if the answer is YES in Step S211) and if the electrical storage device 4 has changed the provisional first communication address into one of the unused communication addresses (in Step S250), the particular bit position is changed.

(Main advantages)

As can be seen from the foregoing description, an auxiliary power supply system 1 according to this embodiment includes a plurality of electrical storage devices 4 that supply power to a backup target. Each of the plurality of electrical storage devices 4 has a communication capability of communicating with an identical communications partner (such as an electrical device 3). Each of the plurality of electrical storage devices 4 provisionally selects one of a plurality of first communication addresses as a provisional communication address of its own. The plurality of first communication addresses have been set for the plurality of electrical storage devices by the electrical device 3 (communications partner) and are as many as the plurality of electrical storage devices 4. Each of the plurality of electrical storage devices 4 returns a response signal in reply to a transmission signal, to which the provisional communication address of its own is added. Each of the plurality of electrical storage devices 4 changes, when finding that any communication error has occurred while returning the response signal, the provisional communication address of its own into one of one or more unused communication addresses belonging to the plurality of first communication addresses that have been set.

According to this configuration, every time any communication error occurs while the electrical storage device is returning the response signal by itself, the electrical storage device changes the provisional communication address of its own into one of the unused communication addresses. Thus, even if there is any overlap in communication address between the plurality of electrical storage devices, the overlap may be eliminated gradually, thus finally assigning communication addresses (first communication addresses) to the plurality of electrical storage devices without any overlap. This allows communication addresses to be assigned to the plurality of electrical storage devices after the plurality of electrical storage devices have been connected to the auxiliary power supply system. Consequently, this enables manufacturing and managing the plurality of electrical storage devices without identifying the plurality of electrical storage devices by their communication addresses.

(Variations) Note that the variations to be described below may be adopted in combination as appropriate. The following description of variations will be focused on differences from the exemplary embodiment described above. Also, in the following description of variations, any constituent element, having the same function as a counterpart of the exemplary embodiment described above, will be designated by the same reference numeral as that counterpart's, and description thereof will be omitted herein. Furthermore, the functions of the auxiliary power supply system 1 according to the exemplary embodiment may also be implemented as an auxiliary power supply control method, a program designed to cause one or more processors to perform the auxiliary power supply control method, or a non-transitory storage medium that stores the program thereon. In addition, the functions of the auxiliary power supply system 1 according to the exemplary embodiment described above may also be implemented as, for example, a module which may be used as the electrical storage device 4 of the auxiliary power supply system 1.

The auxiliary power supply control method is a method for controlling an auxiliary power supply system 1 including a plurality of electrical storage devices 4 that supply power to a backup target. Each of the plurality of electrical storage devices 4 has a communication capability of communicating with an identical communications partner (such as the electrical device 3). The auxiliary power supply control method includes a provisionally selecting step, a returning step, and a changing step. The provisionally selecting step includes having each of the plurality of electrical storage devices 4 provisionally select one of a plurality of first communication addresses as a provisional communication address of its own. The plurality of first communication addresses have been set for the plurality of electrical storage devices 4 by the electrical device 3 (communications partner) and are as many as the plurality of electrical storage devices 4. The returning step includes having each of the plurality of electrical storage devices 4 return a response signal in reply to a transmission signal, to which the provisional communication address of its own is added. The changing step includes making each of the plurality of electrical storage devices 4 change, when finding that any communication error has occurred while returning the response signal, the provisional communication address of its own into one of one or more unused communication addresses belonging to the plurality of communication addresses that have been set for the plurality of electrical storage devices.

(First variation)

In the exemplary embodiment described above, each electrical storage device 4 does not store, in a nonvolatile storage device, its own communication address that has been fixed. However, this is only an example and should not be construed as limiting. Alternatively, each electrical storage device 4 may store, in a nonvolatile storage device, its own communication address that has been fixed. This eliminates the need for each electrical storage device 4 to fix its own communication address, from the next time and on, before making normal transmissions.

(Second variation)

In the exemplary embodiment described above, the electrical device 3 is a backup target for the auxiliary power supply 5. However, this is only an example and should not be construed as limiting. Alternatively, any device other than the electrical device 3 may also be a backup target for the auxiliary power supply 5. Also, in the exemplary embodiment described above, the plurality of electrical storage devices 4 supplies power to the same backup target. Alternatively, the plurality of electrical storage devices 4 may supply power to mutually different targets.

(Recapitulation)

As can be seen from the foregoing description of embodiments, the present disclosure has the following aspects.

An auxiliary power supply system (1) according to a first aspect includes a plurality of electrical storage devices (4) that supply power to a backup target (such as an electrical device). Each of the plurality of electrical storage devices (4) has a communication capability of communicating with an identical communications partner (such as an electrical device 3). Each of the plurality of electrical storage devices (4) provisionally selects one of a plurality of first communication addresses as a provisional communication address of its own. The plurality of first communication addresses have been set for the plurality of electrical storage devices (4) by the communications partner and are as many as the plurality of electrical storage devices (4). Each of the plurality of electrical storage devices (4) returns a response signal in reply to a transmission signal, to which the provisional communication address of its own is added. Each of the plurality of electrical storage devices (4) changes, when finding that any communication error has occurred while returning the response signal, the provisional communication address of its own into one of one or more unused communication addresses belonging to the plurality of first communication addresses that have been set.

According to this configuration, every time any communication error occurs while each electrical storage device (4) is returning the response signal by itself, the electrical storage device (4) changes the provisional communication address of its own into one of the unused communication addresses. Thus, even if there is any overlap in communication address of their own between the plurality of electrical storage devices (4), the overlap may be eliminated gradually, thus finally assigning communication addresses (first communication addresses) to the plurality of electrical storage devices (4) without any overlap. This allows communication addresses to be assigned to the plurality of electrical storage devices (4) after the plurality of electrical storage devices (4) have been connected to the auxiliary power supply system (1). Consequently, this enables manufacturing and managing the plurality of electrical storage devices (4) without identifying the plurality of electrical storage devices (4) by their communication addresses.

In an auxiliary power supply system (1) according to a second aspect, which may be implemented in conjunction with the first aspect, the electrical storage device (4) continues to use the provisional communication address of its own when finding that no communication error has occurred while returning the response signal.

This configuration eliminates the need for the electrical storage device (4) to change the provisional communication address of its own when no communication error has occurred while the electrical storage device (4) is returning the response signal by itself.

In an auxiliary power supply system (1) according to a third aspect, which may be implemented in conjunction with the first or second aspect, the electrical storage device (4) monitors communications between the communications partner and the plurality of electrical storage devices (4) and, when finding that the plurality of first communication addresses that have been set includes none of the one or more unused communication addresses, regards the provisional communication address of its own as a final communication address of its own.

This configuration allows each electrical storage device (4) to decide, by a simple method, that the communication addresses have been assigned to the respective electrical storage devices (4) without any overlap.

In an auxiliary power supply system (1) according to a fourth aspect, which may be implemented in conjunction with any one of the first to third aspects, the communications partner goes through multiple repetitive cycles in each of which the communications partner sends transmission signals, one after another, to the plurality of electrical storage devices (4) with the plurality of first communication addresses and a second communication address for the communications partner added one by one in a predetermined order to the transmission signals.

This configuration allows the communications partner to assign communication addresses to the plurality of electrical storage devices (4) without any overlap after the plurality of electrical storage devices (4) have been connected to the auxiliary power supply system (1) just by repeatedly sending transmission signals to the plurality of electrical storage devices (4) with the plurality of first communication addresses and a second communication address added to the transmission signals in a predetermined order. That is to say, it is not until the plurality of electrical storage devices (4) are connected to the auxiliary power supply system (1) that the communication addresses are assigned to the plurality of electrical storage devices (4). Thus, there is no need for the communications partner to perform any special processing.

In an auxiliary power supply system (1) according to a fifth aspect, which may be implemented in conjunction with the fourth aspect, the electrical storage device (4) provisionally selects, as the provisional communication address of its own, one of the plurality of first communication addresses that is added to the transmission signal that the electrical storage device (4) has received next to the transmission signal to which the second communication address is added.

This configuration allows the electrical storage device (4) to provisionally select a communication address of its own by a simple method.

In an auxiliary power supply system (1) according to a sixth aspect, which may be implemented in conjunction with the fourth or fifth aspect, the electrical storage device (4) selects the provisional communication address of its own in a first cycle of the multiple repetitive cycles and returns the response signal in each of the multiple repetitive cycles from a second cycle and on.

This configuration allows the electrical storage device (4) to gradually eliminate the overlap in communication address of their own between the plurality of electrical storage devices (4) from the second cycle of the multiple repetitive cycles and on.

In an auxiliary power supply system (1) according to a seventh aspect, which may be implemented in conjunction with any one of the fourth to sixth aspects, the electrical storage device (4) acquires, by reference to the first communication addresses added to the plurality of transmission signals that the electrical storage device (4) has received in an interval between reception of the transmission signal, to which the second communication address is added, and next reception of the transmission signal, to which the second communication address is added, information about a set of the first communication addresses that have been set.

This configuration allows the electrical storage device (4) to acquire, by sending the transmission signals repeatedly as described above, information about the set of the plurality of first communication addresses that have been set by the communications partner.

In an auxiliary power supply system (1) according to an eighth aspect, which may be implemented in conjunction with any one of the fourth to seventh aspects, the electrical storage device (4) includes a storage device (42) that stores a unique manufacturing number. The electrical storage device (4) returns a first response signal as the response signal when a bit at a particular bit position in a bit sequence, representing the unique manufacturing number, is zero and returns a second response signal as the response signal when the bit at the particular bit position is one. The first response signal causes, when the second response signal is also returned by another electrical storage device (4) that shares an identical first communication address with the electrical storage device (4) as the communication address of their own, no communication error while the electrical storage device (4) is returning the first response signal. The second response signal causes, when the first response signal is also returned by another electrical storage device (4) that shares the identical first communication address with the electrical storage device (4) as the communication address of their own, a communication error while the electrical storage device (4) is returning the second response signal.

This configuration allows the electrical storage device (4) that has provisionally selected the same communication address as the provisional communication address of its own as another electrical storage device (4) to cause a communication error by using the manufacturing number unique to the former electrical storage device (4) while returning the response signal.

In an auxiliary power supply system (1) according to a ninth aspect, which may be implemented in conjunction with the eighth aspect, the first response signal is data 0x00 in hexadecimal representation, and the second response signal is data 0xFF in hexadecimal representation.

This configuration allows the first response signal and the second signal to be formed easily using 0x00 and 0xFF in hexadecimal representation. Suppose out of a plurality of electrical storage devices (4) that have provisionally selected the same communication address as the provisional communication address of their own, one electrical storage device (4) has transmitted 0x00 and another electrical storage device (4) has transmitted 0xFF. In that case, the transmission of 0x00 is given the higher priority and 0xFF is not transmitted. In that case, a bit error (communication bit) occurs in the electrical storage device (4) that has transmitted 0xFF. Using this characteristic to make the electrical storage device (4) transmit either 0x00 or 0xFF as the response signal allows the electrical storage device (4) that has transmitted 0xFF, among the plurality of electrical storage devices (4) that have provisionally selected the same communication address as the provisional communication address of their own, to cause a bit error (communication error). Meanwhile, if every electrical storage device (4) has transmitted 0xFF, then no communication error will occur.

In an auxiliary power supply system (1) according to a tenth aspect, which may be implemented in conjunction with the eighth or ninth aspect, the electrical storage device (4) shifts, when the electrical storage device (4) has received the transmission signal to which the second communication address is added and there are the one or more unused communication addresses, the particular bit position by one bit from a bit position at one end of the bit sequence, representing the unique manufacturing number, toward a bit position at the other end of the bit sequence.

According to this configuration, if the electrical storage device (4) has received the transmission signal to which the second communication address is added and there are the unused communication addresses, then the particular bit position may be shifted by one bit. This makes it easier to give an equal opportunity to a plurality of electrical storage devices (4) that have provisionally selected the same communication address as the provisional communication address of their own to cause a communication error.

In an auxiliary power supply system (1) according to an eleventh aspect, which may be implemented in conjunction with any one of the eighth to tenth aspects, the electrical storage device (4) returns, when finding that the particular bit position that has been shifted by one bit from a bit position at one end of the bit sequence, representing the unique manufacturing number, toward a bit position at the other end of the bit sequence is located at the bit position at the other end of the bit sequence, the particular bit position to the bit position at the one end of the bit sequence.

This configuration allows the particular bit position to be shifted an unlimited number of times in a bit sequence having a finite number of bits.

In an auxiliary power supply system (1) according to a twelfth aspect, which may be implemented in conjunction with any one of the eighth to tenth aspects, the electrical storage device (4) returns the particular bit position to an initial position when changing the provisional communication address of its own into one of the one or more unused communication addresses.

This configuration enables returning the particular bit position to an initial position by using the timing when the electrical storage device (4) has changed the provisional communication address of its own. That is to say, the respective manufacturing numbers of a plurality of electrical storage devices (4) to be built in the auxiliary power supply (5) will have relatively close values. Thus, choosing a particular bit position counted from the least significant bit of the manufacturing number makes it easier to generate mutually different response signals at an early stage, which would allow the communication address of its own to be fixed more quickly. According to the present disclosure, the particular bit position is returned to the initial position by using the timing when the electrical storage device (4) has changed the provisional communication address of its own.

In an auxiliary power supply system (1) according to a thirteenth aspect, which may be implemented in conjunction with any one of the first to twelfth aspects, the electrical storage device (4) finds the one or more unused communication addresses by monitoring a status of communication between the communications partner and the plurality of electrical storage devices (4).

This configuration allows the electrical storage device (4) to find the unused communication addresses by a simple technique.

In an auxiliary power supply system (1) according to a fourteenth aspect, which may be implemented in conjunction with any one of the first to thirteenth aspects, the electrical storage device (4) is addable besides the plurality of electrical storage devices (4).

This configuration allows the electrical storage device (4) to be further added after the plurality of electrical storage devices (4) have been connected to the auxiliary power supply system (1).

In an auxiliary power supply system (1) according to a fifteenth aspect, which may be implemented in conjunction with any one of the first to fourteenth aspects, the communications partner is the backup target.

This configuration allows the backup target to be the communications partner.

In an auxiliary power supply system (1) according to a sixteenth aspect, which may be implemented in conjunction with any one of the first to fifteenth aspects, a communications protocol for use in communication between the plurality of electrical storage devices (4) and the communications partner is either LIN or extended LIN.

This configuration allows LIN to be used as a communications protocol for the communication between the plurality of electrical storage devices (4) and the communications partner.

In an auxiliary power supply system (1) according to a seventeenth aspect, which may be implemented in conjunction with any one of the first to sixteenth aspects, the backup target is in-vehicle equipment.

This configuration allows in-vehicle equipment to be used as the backup target.

A module according to an eighteenth aspect is designed to be used as the electrical storage device (4) in the auxiliary power supply system (1) according to any one of the first to seventeenth aspects.

This aspect enables providing a module for use as an electrical storage device (4) in an auxiliary power supply system (1).

An auxiliary power supply control method according to a nineteenth aspect is a method for controlling an auxiliary power supply system (1) including a plurality of electrical storage devices (4) that supply power to a backup target. Each of the plurality of electrical storage devices (4) has a communication capability of communicating with an identical communications partner. The auxiliary power supply control method includes a provisionally selecting step, a returning step, and a changing step.

The provisionally selecting step includes having each of the plurality of electrical storage devices (4) provisionally select one of a plurality of first communication addresses as a provisional communication address of its own. The plurality of first communication addresses have been set for the plurality of electrical storage devices (4) by the communications partner and are as many as the plurality of electrical storage devices (4). The returning step includes having each of the plurality of electrical storage devices (4) return a response signal in reply to a transmission signal, to which the provisional communication address of its own is added. The changing step includes making each of the plurality of electrical storage devices (4) change, when finding that any communication error has occurred while returning the response signal, the provisional communication address of its own into one of one or more unused communication addresses belonging to the plurality of first communication addresses that have been set.

According to this method, every time any communication error occurs while each electrical storage device is returning the response signal by itself, the electrical storage device changes the provisional communication address of its own into one of the unused communication addresses. Thus, even if there is any overlap in communication address of their own between the plurality of electrical storage devices, the overlap may be eliminated gradually, thus finally assigning communication addresses (first communication addresses) to the plurality of electrical storage devices without any overlap. This allows communication addresses to be assigned to the plurality of electrical storage devices after the plurality of electrical storage devices have been connected to the auxiliary power supply system. Consequently, this enables manufacturing and managing the plurality of electrical storage devices without identifying the plurality of electrical storage devices by their communication addresses.

A program according to a twentieth aspect is designed to cause one or more processors to perform the auxiliary power supply control method according to the nineteenth aspect.

This aspect enables providing a program designed to cause one or more processors to perform the auxiliary power supply control method described above.

REFERENCE SIGNS LIST

1 Auxiliary Power Supply System
3 Electrical Device (Backup Target, Communication Partner)
4 Electrical Storage Device
43 Communications Unit (Communication Capability)

The invention claimed is:

1. An auxiliary power supply system comprising a plurality of electrical storage devices configured to supply power to a backup target,
    each of the plurality of electrical storage devices having a communication capability of communicating with an identical communications partner,
    each of the plurality of electrical storage devices being configured to:
    provisionally select one of a plurality of first communication addresses as a provisional communication address of its own, the plurality of first communication addresses having been set for the plurality of electrical storage devices by the communications partner, the plurality of first communication addresses being as many as the plurality of electrical storage devices,
    return a response signal in reply to a transmission signal, to which the provisional communication address of its own is added; and
    change, when finding that any communication error has occurred while returning the response signal, the provisional communication address of its own into one of one or more unused communication addresses belonging to the plurality of first communication addresses that have been set.

2. The auxiliary power supply system of claim 1, wherein the electrical storage device is configured to continue to use the provisional communication address of its own when finding that no communication error has occurred while returning the response signal.

3. The auxiliary power supply system of claim 1, wherein the electrical storage device is configured to monitor communications between the communications partner and the plurality of electrical storage devices and,
    the electrical storage device is configured to, when finding that the plurality of first communication addresses that have been set includes none of the one or more unused communication addresses, regard the provisional communication address of its own as a final communication address of its own.

4. The auxiliary power supply system of claim 1, wherein the communications partner is configured to go through multiple repetitive cycles in each of which the communications partner sends transmission signals, one after another, to the plurality of electrical storage devices with the plurality of first communication addresses and a second communication address for the communications partner added one by one in a predetermined order to the transmission signals.

5. The auxiliary power supply system of claim 4, wherein the electrical storage device is configured to provisionally select, as the provisional communication address of its own, one of the plurality of first communication addresses that is added to the transmission signal that the electrical storage device has received next to the transmission signal to which the second communication address is added.

6. The auxiliary power supply system of claim 4, wherein the electrical storage device is configured to select the provisional communication address of its own in a first cycle of the multiple repetitive cycles and return the response signal in each of the multiple repetitive cycles from a second cycle and on.

7. The auxiliary power supply system of claim 4, wherein the electrical storage device is configured to acquire, by reference to the plurality of first communication addresses added to the plurality of transmission signals that the electrical storage device has received in an interval between reception of the transmission signal, to which the second communication address is added, and next reception of the transmission signal, to which the second communication address is added, information about a set of the first communication addresses that have been set.

8. The auxiliary power supply system of claim 4, wherein the electrical storage device includes a storage device configured to store a unique manufacturing number, and is configured to return a first response signal as the response signal when a bit at a particular bit position in a bit sequence, representing the unique manufacturing number, is zero and return a second response signal as the response signal when the bit at the particular bit position is one,
the first response signal causes, when the second response signal is also returned by another electrical storage device that shares an identical first communication address with the electrical storage device as the communication address of their own, no communication error while the electrical storage device is returning the first response signal, and
the second response signal causes, when the first response signal is also returned by another electrical storage device that shares the identical first communication address with the electrical storage device as the communication address of their own, a communication error while the electrical storage device is returning the second response signal.

9. The auxiliary power supply system of claim 8, wherein the first response signal is data 0x00 in hexadecimal representation, and
the second response signal is data 0xFF in hexadecimal representation.

10. The auxiliary power supply system of claim 8, wherein
the electrical storage device is configured to, when the electrical storage device has received the transmission signal to which the second communication address is added and there are the one or more unused communication addresses, shift the particular bit position by one bit from a bit position at one end of the bit sequence, representing the unique manufacturing number, toward a bit position at the other end of the bit sequence.

11. The auxiliary power supply system of claim 8, wherein
the electrical storage device is configured to, when finding that the particular bit position that has been shifted by one bit from a bit position at one end of the bit sequence, representing the unique manufacturing number, toward a bit position at the other end of the bit sequence is located at the bit position at the other end of the bit sequence, return the particular bit position to the bit position at the one end of the bit sequence.

12. The auxiliary power supply system of claim 8, wherein the electrical storage device is configured to return the particular bit position to an initial position when changing the provisional communication address of its own into one of the one or more unused communication addresses.

13. The auxiliary power supply system of claim 1, wherein
the electrical storage device is configured to find the one or more unused communication addresses by monitoring a status of communication between the communications partner and the plurality of electrical storage devices.

14. The auxiliary power supply system of claim 1, wherein
the electrical storage device is addable besides the plurality of electrical storage devices.

15. The auxiliary power supply system of claim 1, wherein
the communications partner is the backup target.

16. The auxiliary power supply system of claim 1, wherein
a communications protocol for use in communication between the plurality of electrical storage devices and the communications partner is either Local Interconnect Network (LIN) or an extended LIN.

17. The auxiliary power supply system of claim 1, wherein
the backup target is in-vehicle equipment.

18. A module designed to be used as the electrical storage device in the auxiliary power supply system of claim 1.

19. An auxiliary power supply control method for controlling an auxiliary power supply system including a plurality of electrical storage devices configured to supply power to a backup target,
each of the plurality of electrical storage devices having a communication capability of communicating with an identical communications partner,
the auxiliary power supply control method comprising:
a provisionally selecting step including having each of the plurality of electrical storage devices provisionally select one of a plurality of first communication addresses as a provisional communication address of its own, the plurality of first communication addresses having been set for the plurality of electrical storage devices by the communications partner, the plurality of first communication addresses being as many as the plurality of electrical storage devices,
a returning step including having each of the plurality of electrical storage devices return a response signal in reply to a transmission signal, to which the provisional communication address of its own is added; and
a changing step including making each of the plurality of electrical storage devices change, when finding that any communication error has occurred while returning the response signal, the provisional communication address of its own into one of one or more unused communication addresses belonging to the plurality of first communication addresses that have been set.

20. A non-transitory storage medium storing a program which is designed to cause one or more processors to perform the auxiliary power supply control method of claim 19.

* * * * *